United States Patent [19]

Michel et al.

[11] Patent Number: 4,511,988
[45] Date of Patent: Apr. 16, 1985

[54] ELECTRONIC EVENT OR BIT GENERATOR HAVING A PREDETERMINED OCCURRENCE RATE WITH A PREDETERMINED EVENT OR BIT DISTRIBUTION

[76] Inventors: Urien Michel, Rue du Park Moan, Brélevenez; Theron M. P. J. Guy, 42, rue de Lorraine, both of F-22300 Lannion, France

[21] Appl. No.: 398,993

[22] Filed: Jul. 16, 1982

[30] Foreign Application Priority Data

Jul. 17, 1981 [FR] France .................. 81 14312

[51] Int. Cl.³ .................. G06F 1/02; G06F 15/31
[52] U.S. Cl. .................. 364/717
[58] Field of Search .................. 364/717; 331/78; 328/59

[56] References Cited

U.S. PATENT DOCUMENTS

| | | | |
|---|---|---|---|
| 3,614,399 | 10/1971 | Linz .................. | 364/717 |
| 3,746,847 | 7/1973 | Maritsas .................. | 364/717 |
| 3,946,215 | 3/1976 | May .................. | 364/717 |
| 3,961,169 | 6/1976 | Bishop et al. .................. | 364/717 |
| 4,213,101 | 7/1980 | Policand et al. .................. | 331/78 |
| 4,218,748 | 8/1980 | Goodwin .................. | 364/717 |

*Primary Examiner*—David H. Malzahn
*Attorney, Agent, or Firm*—Laff, Whitesel, Conte & Saret

[57] ABSTRACT

The electronic bit generator includes a clock, a pseudo-random sequence generator, a counter having the same capacity as the pseudo-random sequence generator and a comparator. One input of the comparator is connected from the output of the pseudo-random sequence generator, and the other input is connected from the data output of the counter. The output of the comparator is connected to the reset input of the counter and to the clock input of the pseudo-random sequence generator. The clock input of the counter is connected from the output of the clock and the comparator output constitutes the output of the electronic bit generator. The comparator comprises a plurality of stages having a number which is equal to the length of the output binary word of the pseudo-random sequence generator. Each comparator stage includes an exclusive-OR gate, the two inputs of which are respectively connected from the outputs of the stages having the same rank in the pseudo-random sequence generator and in the counter. The output of the exclusive-OR gate is connected to one input of an AND gate, the other input is connected to a voltage source through a contact of a controllable switch. The output of the exclusive-OR gate is connected to the input of an AND gate which is common to all the stages of the comparator. The output of the AND gate is the electronic bit generator output.

3 Claims, 4 Drawing Figures

ELECTRONIC EVENT OR BIT GENERATOR HAVING A PREDETERMINED OCCURRENCE RATE WITH A PREDETERMINED EVENT OR BIT DISTRIBUTION

This invention relates to an electronic event or bit generator having a predetermined occurrence rate with a predetermined event or bit distribution.

The bit generators known in the art enable a choice of only the occurrence rate of the bits. As a general rule, the generators include a register with n flip-flop circuits connected in a plurality of loops including well-known feedback circuits, for delivering pseudo-random pulse sequences. The delivered sequence has a length of $(2^n-1)$ and the bits have an occurrence rate equal to 0.5. The occurrence rate may be varied by performing a number of divisions. However, known generators do not allow bits to be produced at short intervals, and possibly consecutive bits, with a low occurrence rate.

An object of this invention is to provide an electronic bit generator which is capable of producing sequences of bits which can be timely close, but with a low occurrence rate. As far as this invention is applied to the field of telecommunications the generator allows bits to be produced of the "error burst" type, as it actually happens in data transmission.

Another object of this invention is to provide a generator wherein the bit occurrence rate may be selected among a number of possible values and wherein the occurrence of some intervals between the bits may be independently favored.

A further object of the invention is to provide a generator wherein the occurrence rate of the bits may be selected at will and wherein intervals between the successive bits are pseudo-random.

According to a feature of the invention, an electronic bit generator is provided, which includes a clock, a pseuo-random sequence generator, a counter having the same capacity as the pseudo-random sequence generator, a comparator with one input connected to the output of the pseudo-random sequence generator and the other input connected to the data output of the counter. A comparator has an output connected, on the one hand, to the reset input of the counter and, on the other hand, to the clock input of the pseudo-random sequence generator. The clock input of the counter is connected to the clock output, and the comparator output is the output of the electronic bit generator.

According to another feature of the invention, the comparator is comprised of a plurality of stages, the number of which is equal to the length of the output binary word of the pseudo-random sequence generator. Each stage includes an exclusive-OR gate having two inputs which are respectively connected to the outputs of the stages having the same rank in the pseudo-random sequence generator and in the counter. The output of the exclusive-OR gate is connected to one input of a NAND gate, of which the other input is connected to a voltage source through a contact of a controllable switch. The output of the NAND gate is connected to the input of an AND gate which is common to all of the comparator stages, the output of the AND gate being the output of the electronic bit generator.

According to a further feature of the invention, the clock includes a time base and output which is connected to the input of a frequency divider. A switching circuit selects the outputs of the divider, one output of the switching circuits being connected to the clock input of the counter and a further input of the AND gate being associated with the comparator. Another output of the switching circuit is connected to the input of a flip-flop of which the output is connected to the reset input of the counter and the D input is connected to the output of the AND gate through an inverter.

The above mentioned features of this invention, as well as others, will appear more clearly from the following description of an embodiment, the description being made in conjunction with the accompanying drawings, wherein.

Figure 1:
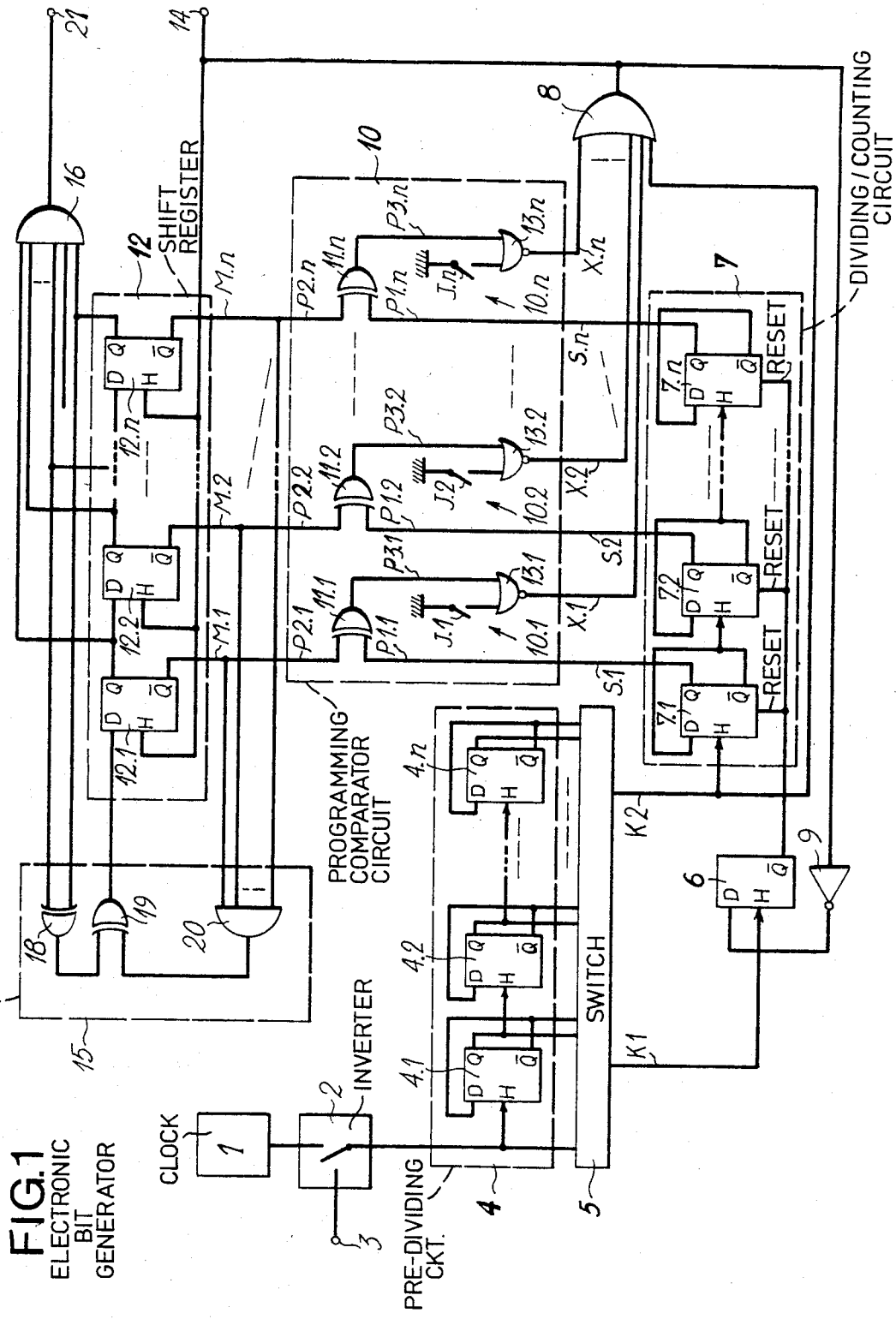
FIG. 1 is the block-diagram of an electronic bit generator according to this invention.

In the bit generator shown in FIG. 1, the clock or time base circuit 1 having its output connected to a fixed contact of switch 2 is connected to a terminal 3 giving the possibly of an access to an external clock or time base. The mobile contact of switch 2 is connected on the one hand, to the input of a pre-dividing circuit 4 and, on the other hand, to a first input of a switching circuit 5.

Figure 2:
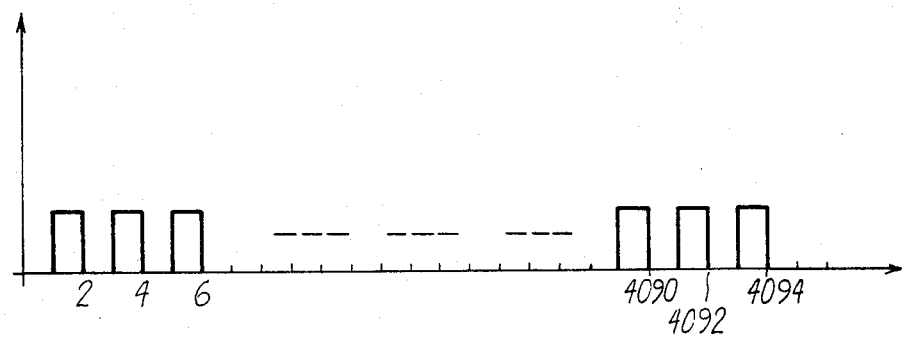
FIG. 2 is a time chart illustrating a first operation mode for the generator of FIG. 1.
Figure 3:
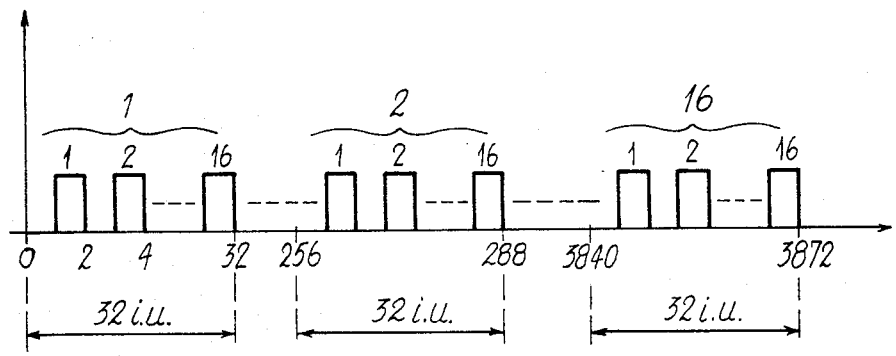
FIG. 3 is a time chart illustrating a second operation mode for the generator of FIG. 1.

As shown in FIG. 2, the pre-dividing circuit 4 comprises n flip-flops 4.1, 4.2, ..., 4.n which are arranged as a divide-by-two circuit and are so connected that they form a divide-by-two$^n$ with n stages. Each stage of the circuit 4 has its outputs Q and $\overline{Q}$ connected to the corresponding inputs of the switching circuit 5. Accordingly, the signal delivered from the clock or time base 1 with a period T and the signals having the periods $S^kT$, with K varying from 1 to m, are all applied to the $(2n+1)$ inputs of the circuit 5. The switching circuit 5 has two outputs K1 and K2 delivering a frequency signal fo and a frequency signal fo/$2^p$, respectively, with p between 1 and n. In practice, the switching circuit 5 is a crosspoint matrix or a multiplexer circuit for enabling a selection of the connections between the outputs K1 and K2 and two inputs out of the possible $(2n+1)$ inputs, the frequences of the signals applied to the inputs (from circuit 4 to circuit 5) corresponding to fo and fo/$2^p$. Output K1 is connected to the clock input of a flip-flop 6 while output K2 is connected, on the one hand, to the signal input of a n stage dividing circuit 7 and, on the other hand, to one input of a coincidence circuit 8.

Input D of flip-flop 6, FIG. 1, is connected from the output of an inverter 9, and output $\overline{Q}$ of flip-flop 6 is connected to the reset inputs RESET of the n stages of the divider 7. The input of the inverter 9 is connected from the output of the coincidence circuit 8. Output Q of flip-flop 6 copies the condition of the inverter 9 for each rising edge of the time pulses delivered from output K1. Flip-flop 6 acts a reset circuit for divider 7.

As shown in FIG. 1, the stages of the divider 7 are flipflops 7.1, 7.2, ..., 7.n arranged as a divide-by-two circuit. The clock input H of flip-flop 7.1 is connected from output K2 of the switching circuit 5, its output $\overline{Q}$ being connected to its input D and to the clock input H of flip-flop 7.2, and its output Q being connected to one input of a programming circuit 10, and so on. The output of each stage of the divider 7 is thus connected to a corresponding input of the circuit 10. The reset inputs RESET of the flip-flops 7.1–7.n are connected from the output $\overline{Q}$ of flip-flop 6.

Flip-flops 7.1–7.n are serially incremented by the rising edge of each pulse from output K2, and are reset by a low-level signal from output $\overline{Q}$ of circuit 6.

The programming circuit 10, FIG. 1, comprises a series of n stages 10.1–10.n. Each elementary stage 10.k is an exclusive-OR circuit 11.k with one input p1.k connected from output S.k of the k-rank stage in divider 7, and with the other input P.2k connected from output M.k of a shift register 12 which has also n stages. The output of the exclusive-OR circuit Pk is connected to one input P3.k of a two input NAND circuit 13.k whose second input may be grounded through a switch Jk. The output of NAND circuit 13.k is connected through a wire Xk to a corresponding input of the coincidence circuit 8.

As already mentioned, the output of the coincidence circuit 8 is connected to the input of the inverter 9 and, in addition, on the one hand, to the clock inputs H of the stage of the shift register 12 and, on the other hand, to the output 14 of the generator.

The shift register 12 comprises n stages, each stage comprising a D-type flip-flops 12.k. The flip-flops 12.1–12.n are serially connected, the output Q of one flip-flop being connected to the input D of the next flip-flop, their clock inputs H being connected in parallel from output of circuit 8. The input D of the first flip-flop 12.1 is connected to the output of a feedback circuit 15. The outputs Q of the flip-flops 12.1–12.n are also connected in parallel to the input of a timing circuit 16 of which the output is connected to the timing output terminal 17 of the generator. The outputs $\overline{Q}$ of the flip-flops 12.1–12.n are respectively connected to the inputs P.2.1P2.n of the programming circuit 10, through the outputs Ml–Mn. Moreover, a number of the outputs Q of the flip-flops 12.1–12.n are connected to the corresponding inputs of the feedback circuit 15 forming a multiple loop arrangement so that the shift register operates as a pseudo-random sequence generator.

By way of an example, with a pseudo-random register having eleven stages, the length of the sequence will be a maximum for a loop arrangement including outputs Q of flip-flops 12.9 and 12.11.

The feedback circuit 15 comprises an exclusive-OR circuit 18 of which the inputs are connected from outputs Q of the flip-flops 12.9 and 12.11, in the embodiment, and of which the output is connected to an input of an exclusive OR-circuit 19. The second input of the exclusive-OR circuit 19 is connected to the output of an AND circuit 20 of which the inputs are respectively connected from outputs $\overline{Q}$ of the flip-flops 12.1–12.n. The output of exclusive-OR circuit 19 is connected to input D of flip-flop 12.1. The AND circuit 20 operates as an automatic start circuit in setting to "1", the output of the circuit 19, in case all of the outputs $\overline{Q}$ of the flip-flops 12.1–12.n are at "0" when the generator is first energized.

The timing circuit 16 comprises an AND gate which delivers a digit "1" from the terminal 21 each time all the outputs Q of the flip-flops 12.1–12.n are at "1". In the described embodiment, using an 11-stage register 12, the circuit 16 delivers a pulse every 2047th binary digit. Signals from output 20 may be used as timing signals for a receiving apparatus, as the one described in the U.S. patent application Ser. No. 289,303 filed on Aug. 3, 1981 by the applicants.

In a first operating mode of the generator, it will be assumed that the switches J1–J11 are all closed. Thus, each NAND circuit 13.1–13.11 has one of its inputs at "1". When the binary word stored in register 12 is the complement of the word stored in the divider 7, a digit "1" is simultaneously delivered from all the exclusive OR circuit 11.1–11.11, so that a digit "9" is delivered from all the circuit 13.1–13.11. The first eleven inputs of the coincidence circuit 8 are at "0". When the output K2 supplies a signal having the level "0", the circuit 8 supplies an output signal which, first, changes the state of the register 12 since the clock inputs of its stages receive a signal, second, resets the counter 7 through the inverter 9 and the flip-flop 6 when the output K1 of the circuit 5 turns to "1", and third, generates a signal on the terminal 14, which signal is the output signal of the generator.

At this time, a new word is registered in the register 12, and the counter 7 begins to count again from zero at the frequency of the counting signal delivered from output K2 of the circuit switch 5. When the count in the counter 7 corresponds to the word in the register 12, the above described operation is resumed.

It appears that the time between two output signals of the circuit 8 depends on the value of the word in the shift register 12. The shift register 12 is precisely arranged as a pseudo-random sequence generator. It appears that the distribution of the intervals between the bits or events will be a pseudo-random distribution at the output of the circuit 8. The corresponding chart of the time intervals between the bits is shown in FIG. 2. The register 12, which has eleven stages, supplies $2^{11} - 1$ words successively, i.e. 2047 different time intervals for one cycle.

Now, if one switch Jk is open, such as the switch J.5, each time the word in the register 12 includes a bit of weight 5 which is equal to "1", a signal will no longer be delivered from the circuit 8 because the counter 7 will reach a count which is complementary to the word, but a signal will be supplied when the counter reaches another value. Therefore, some time intervals between bits have been inhibited. The corresponding words have the bit of weight 5, in order to take advantage of other time intervals. If several switches Jk are open, coincidences are supressed for several weights. Means are thus provided for giving an advantage to certain time intervals between bits with respect to other time intervals. The graph of the time intervals between bits is shown FIG. 5 in case the switches J1 to J4 and J8 to J11 are open. It appears that the possible time intervals are maintained only between intervals 0 to 32 u.i. (or unit time intervals), 256 and 288 u.i.; and 3840 and 3872 u.i.; without modification of the mean occurence rate of the bits.

In practice, the occurrence rate of the bits may be varied by changing the time base.

In the feedback circuit 15, when all the outputs Q are at "1", after a main interruption for instance, the output of the AND gate 20 is at "1" while the output of the circuit 18 is at "0", since the outputs Q of the flip-flops 12.9 and 12.11 are at "0". Therefore, the output of the circuit 19 is at "1", and the shift register 12 is started.

Figure 4:
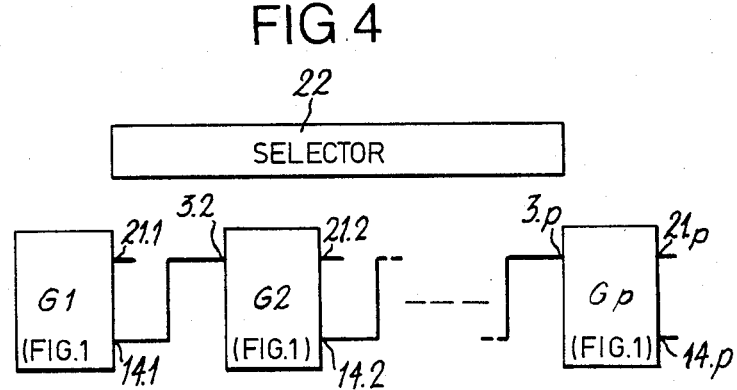
FIG. 4 is the block-diagram of a generator including a series of generators according to the generator of the FIG. 1.

Referring now to FIG. 4, p elementary generators G1 to Gp identical to the generator of the FIG. 1 are arranged in series, the output 14 of one generator FK being connected to the input 3(k+1) of the next generator in the series. A selection circuit 22 selects a pair of outputs 14 and 21 of a generator, in the series, i.e., selects a mean occurrence rate. Of course, the switches Jk of the generators are at the disposal of the operator for changing the graph of the time intervals between bits.

Those who are skilled in the art will readily perceive how to modify the invention. Therefore, the appended claims are to be construed to cover all equivalent structures which fall within the true scope and spirit of the invention.

We claim:

1. An electronic event generator comprising time base means having an output terminal; pseudo-random sequence generator means having an output terminal and a clock terminal; counter means having output, clock, and reset terminals; comparator means having an output terminal and a plurality of stages which are equal to the number of the length of an output binary word of the pseudo-random sequence generator means, each of said stages including an exclusive OR gate having two inputs and an output terminal, the two inputs of each exclusive OR gate being respectively connected from the outputs of the stages having the same rank in the pseudo-random sequence generator means said in the counter means; said comparator means having one input which is connected to the output terminal of the pseudo-random sequence generator means, and another input which is connected to the output terminal of the counter means, the output terminal of the comparator means being connected to a reset terminal of the counter means and to the clock terminal of the pseudo-random sequence generator means, the clock terminal of the counter means being connected to the output terminal of the time base means; a two-input AND gate associated with each of the exclusive OR gates, one input of each two-input AND gates being connected to the output terminal of its associated exclusive OR gate; a voltage source; a controllable switch; the other input of each AND gate being connected to said voltage source via a contact of said controllable switch; a multiple-input AND gate which is common to all the stages of the comparator, the output of each of the two input AND gates being connected to a corresponding input on the multiple-input AND gate, the output of the multiple-input AND gate being the output of the electronic event generator.

2. The electronic event generator of claim 1 and a clock means, variable frequency divider means having an input which is driven by said clock means, switching means for selecting an output of said frequency divider means, means for applying the output of said switching means to the clock terminal of said counter means and to an input of said multiple-input AND gate, flip-flop circuit means having an input coupled to the output of said switching means, the output of said flip-flop circuit means being connected to said reset terminal of said counter means, and means for controlling the operation of said flip-flop circuit means responsive to the output of said multiple-input of said AND gate.

3. The electronic event generator of claim 2 wherein a plurality of said random sequence generator means are arranged in series by connecting the output of one generator means to the input of said frequency divider in the next succeeding generator means, and means for selecting between the outputs of said generator means.

* * * * *